May 16, 1961  W. A. PAPWORTH  2,984,757
MANUALLY PORTABLE TOOL CONSTRUCTION
Filed June 28, 1956  2 Sheets-Sheet 1
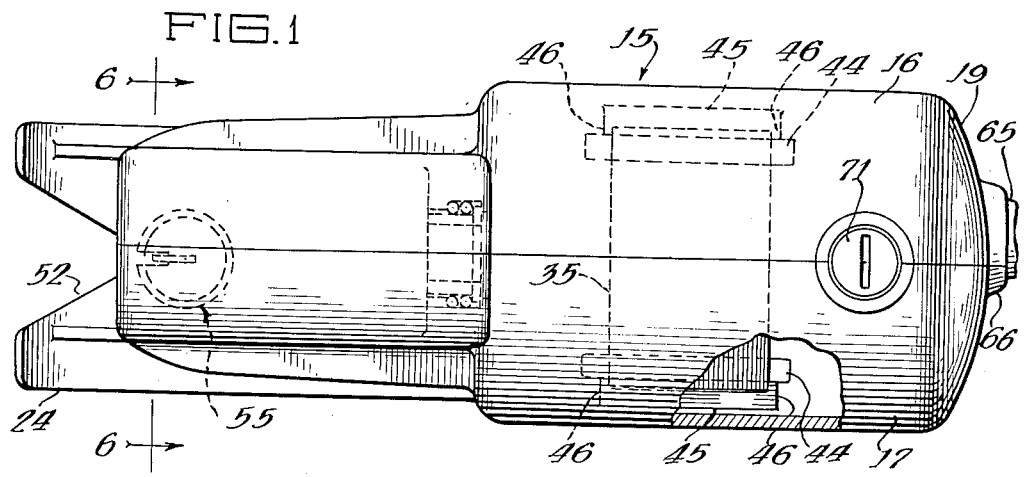
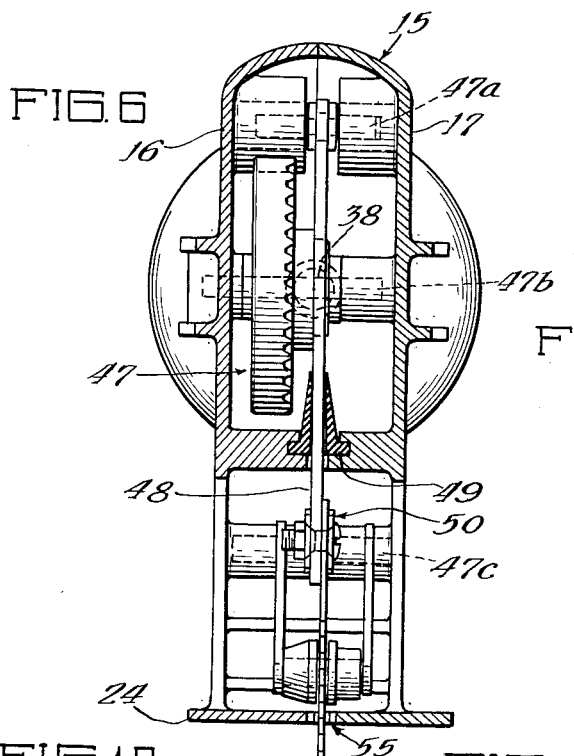
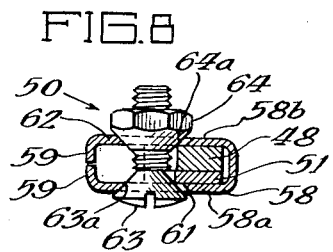
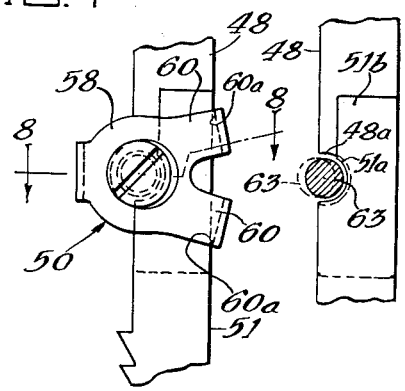
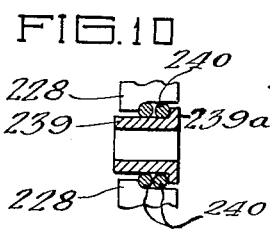
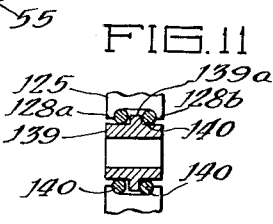
INVENTOR.
Walter A. Papworth
BY
Schroeder, Hofgren,
Brady & Wegner
Attorneys May 16, 1961 W. A. PAPWORTH 2,984,757
MANUALLY PORTABLE TOOL CONSTRUCTION
Filed June 28, 1956 2 Sheets-Sheet 2
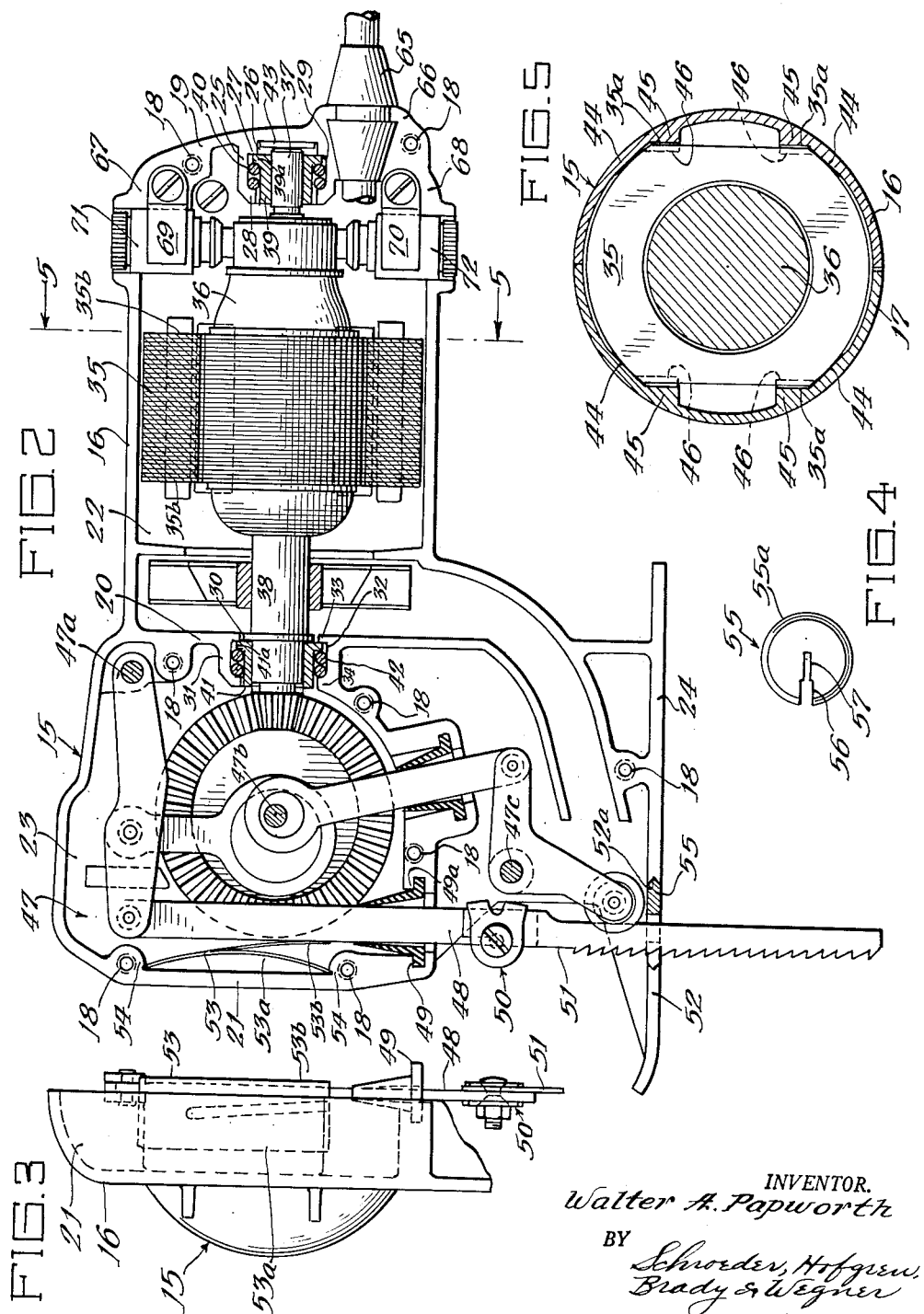
INVENTOR.
Walter A. Papworth
BY Schroeder, Hofgren,
Brady & Wegner
Attorneys

United States Patent Office 2,984,757
Patented May 16, 1961

2,984,757
MANUALLY PORTABLE TOOL CONSTRUCTION
Walter A. Papworth, 110 Berkeley Drive, Syracuse, N.Y.
Filed June 28, 1956, Ser. No. 594,556
12 Claims. (Cl. 310—50)

This invention relates to an improved manually portable power driven cutting tool, and in particular it relates to novel structural features of a tool of the type shown in my copending application Serial No. 467,130, filed November 5, 1954.

The principal object of this invention is to provide a portable power driven cutting tool of advance performance which may be manufactured at low cost.

A further object is to provide such a machine with a minimum of machining operations and factory capacity required.

A definite problem in portable power tool construction is the provision of a frame, or casing in which all the operating components, including an electric motor and bearings for the motor shaft, may be very easily mounted and securely held when the frame is assembled. The present construction utilizes resilient rings, such as O-rings, surrounding the motor shaft bearings, and the frame securely clamps the O-rings and the bearings in which the motor shaft is journalled.

In accordance with the present invention, the frame is die cast in two parts abutting on a longitudinal center plane, with improved interengagement of the frame halves with the motor bearings, the motor field, and other parts, whereby these parts are held accurately in relationship to each other when the frame halves are clamped together. The clamping pressure in assembling the frame takes place first upon the resilient O-rings, next upon the unyielding motor field and also on a rigid throat plate in the casing foot, and last upon abutting surfaces of the casing at the front and rear of the machine which causes the two frame halves to bulge slightly in the area of the motor field and throat plate so as to firmly clamp those parts.

Thus, a very important object of the present invention is to provide a tool of the type described which utilizes an inexpensive cast frame in which the operating components may be very quickly and easily assembled and firmly clamped.

The invention is illustrated in a preferred embodiment in the accompanying drawings, in which:

Fig. 1 is a plan view of a tool embodying the invention with part of the casing broken away to show the mounting for the motor field;

Fig. 2 is a side elevation showing the components assembled into the right half of the frame, prior to fastening on the left half of the frame;

Fig. 3 is a fragmentary front elevation with the left half of the casing removed to show the arrangement of some parts near the front of the unit;

Fig. 4 is a plan view of the throat plate which is shown in section in Fig. 2;

Fig. 5 is a section taken as indicated along the line 5—5 of Fig. 2, showing the motor positioned in the frame;

Fig. 6 is a section taken as indicated along the line 6—6 of Fig. 1;

Fig. 7 is a fragmentary elevational view of the blade clamp on an enlarged scale;

Fig. 8 is a section taken as indicated along the line 8—8 of Fig. 7;

Fig. 9 is a fragmentary sectional view of the tool plunger, saw blade and clamp screw without the clamp to show the action of the screw when it is tightened, the "loose" position of the screw being shown in broken lines and the "clamped" position in section;

Fig. 10 is a fragmentary section on an enlarged scale, showing a modified rear motor shaft bearing; and Fig. 11 is a fragmentary section, similar to Fig. 10, of another modified bearing member.

Referring to the drawings in greater detail, and referring first to Figs. 1 and 2, the device of the present invention has a frame or casing indicated generally at 15 which is composed of two mating die cast halves 16 and 17 which abut along a center plane indicated as D—D in Figs. 1, 3 and 6. In the assembly of the unit all of the components are first assembled into the casing half 16, and the casing half 17 is then secured to the casing half 16 by a plurality of screws, which may be self-tapping screws, at the points indicated by numerals 18. The two frame halves 16 and 17 combine to form a rear wall 19, an intermediate wall 20 and a front wall 21 which define a motor cavity 22 and a gear cavity 23. The frame 15 also has an integral foot plate 24 which is adapted to support the cutting tool upon the work as desired.

On the inner surface of rear wall 19 is a rear hollow bearing boss 25 which is formed of two matching semi-cylindrical boss portions in the two frame halves 16 and 17, and the boss 25 includes a rear cavity 26, an annular rear abutment shoulder 27, and an annular flange 28 which defines, with the shoulder 27, a bearing cavity 29. A motor shaft opening 30 in the intermediate wall 20 is aligned with the axis of the boss 25, and extending into the gear cavity 23 from the intermediate wall 20 is a forward hollow bearing boss 31 providing a front bearing cavity 32 which is defined by a flange 33 surrounding the motor shaft opening 30, and an annular rim 34 at the forward margin of the boss 31.

Mounted in the motor cavity 22 is an electric motor including the usual annular field 35 and an armature 36 which is coaxial with the field and has a rear shaft 37 extending into the rear bearing boss 25 and a front shaft 38 which projects through the shaft opening 30 into the front bearing boss 31. The rear shaft 37 is journalled in a sintered bronze bearing 39 which is surrounded by resilient rings 40 which may conveniently be O-rings, while the forward shaft 38 is journalled in a sintered bronze bearing 41 which is surrounded by O-rings 42. The rear end of shaft 37 abuts against a thrust plate 43 which is carried in the rear cavity portion 36 of the boss 25.

As clearly seen in Fig. 2, the bearings 39 and 41 are provided, respectively, with flanges 39a and 41a which abut, respectively, against the shoulder 27 and the annular flange 33; while the O-rings 40 are retained between the bearing flange 39a and the annular flange 28, and the O-rings 42 are retained between the bearing flange 41a and the annular rim 34. The bearing cavities 29 and 32 are larger than the outside diameter of the respective bearing flanges 39a and 41a, but smaller than the outside diameters of the respective O-rings 40 and 42, so that when the two frame halves 16 and 17 are secured together they compress the O-rings to firmly position the bearings and armature in the frame without pressing directly upon any portion of the bearings.

As seen in Fig. 5, each of the frame halves 16 and 17 is provided with inwardly projecting ribs 44 which act as opposite V-blocks to firmly engage the finished outside cylindrical surface of the field 35, ledges 45 which loosely abut the flat sides 35a of the field to lock it against rotation, and lugs 46 which loosely fit the ends 35b of the field to fix it against endwise movement.

The operating mechanism of the device is described in detail and claimed in my copending application 467,130, filed November 5, 1954, and need not be described in detail in this application. It includes broadly gear and linkage means indicated generally at 47 for operating a tool plunger 48 the lower end of which extends through a resilient seal 49 which is carried in recesses 49a in the frame halves. At the lower end of the tool plunger 48 is a blade fastening means, indicated generally at 50, by means of which a cutting tool such as a saw blade 51 is secured to the tool plunger so as to extend through the rear portion of a V-notch 52 formed by converging inner margins of the foot plate portion 24 of the two frame halves 16 and 17. The saw blade 51 is adapted to cut on the up-stroke.

As best seen in Figs. 2 and 3, a flat spring, indicated generally at 53, is bifurcated to provide a mounting arm 53a which is sprung into arcuate form between two cast abutments 54 in the frame half 16, and a bearing leg 53b which protrudes into the frame half 17 and bears against the front of the tool plunger 48 so as to urge the tool plunger rearwardly.

At the rear of the V-notch 52, the foot plate portion 24 of the frame halves 16 and 17 is provided with a pair of mating, generally semicircular recesses 52a which have beveled margins so that when the two frame halves are fastened together a throat plate, indicated generally at 55, may be clamped in the opening formed by the two semicircular recesses. As best seen in Fig. 4 the throat plate has a beveled margin 55a which is complementary to the beveled margins of the semicircular openings 52a, a relatively wide forwardly open slot 56 flanking the saw teeth, and a narrower slot 57 which closely fits the thickness of the saw blade behind the teeth. Thus, the narrow slot 57 of the throat plate prevents the saw blade from being sprung sidewise, while the broader slot 56 provides clearance for the saw teeth so that there is no contact tending to dull the teeth or upset them.

The blade fastening means 50 consists of a clamp 58 which, as seen in Fig. 8, is generally U-shaped in cross section so as to have spaced arms 58a and 58b which flank the tool plunger 48 and the saw blade 51. A pair of lugs 59 forward of the saw blade and tool plunger limits the extent to which the clamp 58 may be drawn together. Behind the tool plunger and saw blade the clamp 58 has a pair of diverging arms 60 which are seen in Fig. 7 to afford widely spaced bearing surfaces 60a to bite against the rear edges of the tool plunger and saw blade and provide a wide and firm grip upon them. As seen in Fig. 8, the arms 58a and 58b are provided with aligned countersunk holes 61 and 62, respectively, between which the tool plunger and the saw blade are provided with registering notches 48a and 51a, respectively, as best seen in Fig. 9. Above the notch 51a the saw blade has an upper end portion 51b which is narrower than the body of the saw blade below the notch. Extending through the countersunk holes 61 and 62 is a screw 63 having a head with a frusto-conical surface 63a which extends into the countersunk hole 61, and threaded onto the screw is a nut 64 having a frusto-conical surface 64a which extends into the countersunk hole 62.

When the screw and nut are loose, the screw can move forward in the countersunk holes with respect to the notches 48a and 51a in the tool plunger and the saw blade, as shown by the broken line position in Fig. 9, and this permits the saw blade to be removed entirely from the clamp while the clamp itself remains on the tool plunger. When the screw and nut are drawn tight into the clamp, the opposed frusto-conical surfaces 63a and 64a of the screw and nut acting in the countersunk holes 61 and 62 thrusts the screw 63 rearwardly to the solid line position shown in cross section in Fig. 9 so as to draw the clamp 58 tight around the tool plunger and saw blade and simultaneously lock the saw blade against removal from the clamp by butting firmly against the margins of the notches 48a and 51a.

As seen in Figs. 1 and 2, a power cord 65 for the motor extends through an opening in a boss 66 which is formed principally in the frame half 16 but a small portion of which is in the frame half 17. The frame half 16 is also provided with suitable inwardly extending bosses 67 and 68 which are tapped to receive screws for clamps 69 and 70, respectively, by means of which brush holders 71 and 72 are fastened onto the frame half 16.

The assembly of the entire mechanism is quite simple. All of the working parts are assembled into the frame half 16 as seen in Fig. 2; and as seen in Fig. 2 that frame half is provided with suitable transverse bosses containing internal bores for cross shafts 47a, 47b and 47c of the operating mechanism, and these cross shafts extend a substantial distance past the center plane D—D. The opposite frame half 17 is then positioned on the frame half 16 with the cross shafts received in matching internal bores in bosses formed on said frame half. The two frame halves are then firmly secured together with screws at the points 18.

The construction of the frame halves, and particularly the relative dimensions of the frame components with respect to the internal components upon which they bear, is such that when the screws are tightened the first pressure occurs on the resilient O-rings 40 and 42, and on the resilient electric cord 65 and resilient seal 49. The next pressure occurs upon the ribs 44 bearing upon the outer surface of field 35 and upon the beveled margins of the semicircular openings pressing against the throat plate 55. As tightening of the screws is continued the matching surfaces of the frame halves 16 and 17 at the rear wall 19 and the front wall 21 are drawn into tightly abutting relationship, and this pressure at the front and rear of the frame bows the frame halves minutely from the portions surrounding the motor field 35 and the throat plate 55 to the extremities of the frame, so that these parts are securely clamped in the frame.

The frame halves are relatively inexpensive to produce because the only machining operations which are necessary are to drill and ream for the cross shafts 47a, b and c, and to drill and tap for the brush holder clamps 69 and 70.

Figs. 10 and 11 illustrate two modified types of bearings and bearing mountings. The modification shown in Fig. 10 is illustrated and numbered to correspond to the numbering of the rear bearing and bearing mounting shown in Fig. 2, but might be used either at the front or the rear of the motor shaft. The bearing 239 is similar in construction to the bearing 39 and has a similar pair of O-rings 240. The bearing boss has an annular flange 228 which restrains movement of the bearing 239 and O-rings 240 in one direction. This construction is suitable where the motor shaft is provided with a shoulder and washer which can resist displacement of the bearing in a direction opposite the annular flange 228.

The type of bearings shown in Fig. 11 indicated at 139 has a single centrally positioned external flange 139a and O-rings 140 flank the flange 139a. A bearing boss 125 is provided with annular flanges or shoulders 128a and 128b which serve to restrain movement of the O-rings and the bearing 139 in either direction.

The foregoing detailed description is given for clearness of understanding only and no unnecessary limitations are to be understood therefrom, as some modifications will be obvious to those skilled in the art.

I claim:

1. In a manually portable electric powered machine: a motor including a field, an armature, and a shaft through the armature; a flanged bearing on the shaft; a ring of resilient material around the bearing adjacent the flange;

a frame composed of two opposite halves having abutting surfaces in a plane containing the axis of the armature shaft, said frame halves having matching recesses shaped to contain and clamp said field and said bearing in coaxial relation; and means for drawing the frame halves toward each other to clamp them together, said recesses being so proportioned in depth that clamping together the frame halves exerts pressure first on said resilient ring, second on said field, and third on said abutting surfaces.

2. In a manually portable electric powered machine: a hollow bearing having a body portion and an external flange portion; a ring of resilient material around said body portion adjacent to said flange portion, said ring having a diameter larger than said flange portion, the cross section of said ring providing an arcuate surface so that the ring may distort under clamping pressure; a frame comprising two members abutting in a plane containing the axis of said bearing, there being a recess formed by matching cavities in said frame members, said recess having an end portion of diameter larger than the body portion but smaller than the flange portion of said bearing, and said recess having an enlarged portion of a diameter larger than the flange portion of the bearing but smaller than the diameter of said resilient ring; and means for drawing said frame members into clamping engagement with said ring.

3. In a manually portable electric powered machine: a motor having an armature with a shaft, and a field surrounding the armature; a bearing on said shaft; a ring of resilient material embracing the bearing; a frame enclosing and supporting said motor, said frame having two mating halves with abutting surfaces which extend lengthwise with respect to the axis of the shaft, said frame halves being provided with complementary recesses shaped to contain and clamp said field and said bearing with said resilient ring; and means for drawing said frame halves together, said frame recesses being so proportioned in depth that drawing the frame halves together exerts pressure first on the resilient ring, second on the field, and finally on said abutting surfaces.

4. In a manually portable electric powered machine: a motor having an armature with a shaft, and a field surrounding the armature; a bearing on said shaft; a ring of resilient material embracing the bearing; a frame enclosing and supporting said motor, said frame having two mating halves with abutting surfaces which extend lengthwise with respect to the axis of the shaft, said frame halves being provided with complementary recesses shaped to contain and clamp said field and said bearing with said resilient ring; abutment means on said frame restricting axial movement of said bearing; and means for drawing said frame halves together, said frame recesses being so proportioned in depth that drawing the frame halves together exerts pressure first on the resilient ring, second on the field, and finally on said abutting surfaces.

5. In a manually portable electric powered machine: a motor including an armature with a shaft, and a field surrounding the armature; a bearing on said shaft; a resilient ring embracing the bearing, the cross section of said ring providing an arcuate surface so that the ring may distort under clamping pressure; a driven member operatively connected to said shaft; a frame enclosing and supporting said motor and partially enclosing said driven member, said frame having two mating halves with abutting surfaces in a plane which extends lengthwise with respect to the axis of the shaft, said frame halves being provided with complementary recesses to contain and clamp said field and said bearing and ring; a pair of opposed arcuate marginal recesses forming an opening through which the driven member extends, and an external guide portion with opposed faces flanking said driven member; a yieldable seal in said opening around said driven member; a throat plate supported and clamped between said opposed faces, said throat plate having guide surfaces flanking the driven member; and means for drawing said frame halves together, said recesses and the space between said opposed faces being so proportioned that as the frame halves are drawn together pressure is exerted first on the resilient ring and seal, second on the field and throat plate, and third on said abutting surfaces.

6. The device of claim 5 in which the opposed faces of the external guide portion of the frame are recessed and the throat plate has bevelled edges in said recesses.

7. In a manually portable electric powered machine: a motor having an armature with a shaft, and a field surrounding the armature; a bearing on said shaft; a ring of resilient material embracing the bearing; a resiliently covered electric cord for attaching said motor to a source of electric current; a die cast frame enclosing and supporting said motor, said frame having two mating halves with abutting surfaces which extend lengthwise with respect to the axis of the shaft, said frame halves being provided with complementary recesses shaped to contain and clamp said field, said bearing with said resilient ring, and said resiliently covered cord; and means for drawing said frame halves together, said frame recesses being so proportioned in depth that drawing the frame halves together exerts pressure first on the resilient ring and cord, second on the field, and finally on said abutting surfaces.

8. In a manually portable electric powered machine: a motor having an armature with a shaft, and a field surrounding the armature; a bearing on said shaft; a ring of resilient material embracing the bearing; a die cast frame enclosing and supporting said motor, said frame having two mating halves with abutting surfaces which extend lengthwise with respect to the axis of the shaft, said frame halves being provided with complementary recesses shaped to contain and clamp said field and said bearing with said resilient ring; abutment means on said frame restricting axial movement of said bearing and said ring; and means for drawing said frame halves together, said frame recesses being so proportioned in depth that drawing the frame halves together produces pressure first on the resilient ring, second on the field member, and finally on the abutting surfaces, whereby the armature is held in cushioned coaxial relation with reference to the field.

9. In a manually portable electric powered machine: a motor including an armature and a field, said field having a finished outer surface; a bearing on said shaft; a ring of resilient material embracing said bearing; a die cast frame enclosing and supporting said motor, said frame having two mating halves with abutting surfaces which extend lengthwise with respect to the axis of the shaft, said frame halves being provided with complementary recesses to contain said field and said bearing with said resilient ring; a plurality of opposed, integral ribs inside the frame adapted to bear on the finished outer surface of the field to fixedly position the field against lateral movement; integral abutment means in the frame loosely retaining the field against rotary and endwise movement; and means for drawing said frame halves into abutting relationship, said recesses and ribs being so proportioned in depth from the abutting surfaces that drawing the frame halves together exerts pressure first on the resilient ring and second on the finished outer surface of the field.

10. In a manually portable electric powered machine: a frame having two mating halves with abutting longitudinal surfaces, said halves having complementary motor receiving recesses; integral motor positioning pads in said recesses; integral, mating bosses at the two ends of said recesses defining complementary, aligned bearing receiving recesses, said bosses having semi-annular flanges at one side of each bearing recess and semi-annular shoulders at the opposite side of each said recess; bearing means in each recess comprising a bearing sleeve with a resilient ring frictionally embracing the sleeve, the cross section of said ring providing an arcuate surface so that the ring may distort under clamping pressure, and said bearing means being confined between the flanges and the shoulders; a motor mounted in said motor receiving recesses with a field cradled in said pads, and an armature with a shaft extending longitudinally of the frame which is journalled in said bearing sleeves; and means for drawing said frame halves together, said recesses being so proportioned in depth that drawing the frame halves together exerts pressure first on the resilient ring, second on the field, and finally on said abutting surfaces.

11. The device of claim 10 in which the bearing sleeve has an external annular flange abutting the shoulders on the bosses, and the resilient ring abuts the semi-annular flanges on the bosses.

12. The device of claim 10 in which the bearing sleeve has an external annular flange midway of its length, there is a resilient ring on each side of said annular flange, and one ring abuts the semi-annular flanges on the bosses while the other abuts the semi-annular shoulders.

References Cited in the file of this patent

UNITED STATES PATENTS

| | | |
|---|---|---|
| 461,325 | Deniston | Oct. 13, 1891 |
| 2,009,124 | Sholfield | July 23, 1935 |
| 2,261,816 | Williams | Nov. 4, 1941 |
| 2,349,401 | Beckwith | May 23, 1944 |
| 2,440,950 | Hill | May 4, 1948 |
| 2,603,674 | Kock | July 15, 1952 |
| 2,695,522 | Papworth | Nov. 30, 1954 |
| 2,722,244 | Schultz | Nov. 1, 1955 |
| 2,737,984 | Bruck | Mar. 13, 1956 |
| 2,752,514 | Schwenden | June 26, 1956 |